US006498935B1

United States Patent
Cannon et al.

(10) Patent No.: US 6,498,935 B1
(45) Date of Patent: Dec. 24, 2002

(54) CHANNEL SELECTION AND CLARITY IMPROVEMENT FOR DIGITAL CORDLESS TELEPHONES OPERATING IN AN OVERLAPPED RANGE

(75) Inventors: Joseph M. Cannon, Harleysville, PA (US); Richard L. McDowell, Chalfont, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/293,850

(22) Filed: Apr. 19, 1999

(51) Int. Cl.$^7$ .................................................. H04Q 7/20
(52) U.S. Cl. ........................ 455/464; 455/426; 455/462
(58) Field of Search ................................. 455/426, 450, 455/452, 462, 463, 464, 465, 509, 513; 370/322, 329, 341, 348

(56) References Cited

U.S. PATENT DOCUMENTS

| 5,758,290 | A | * | 5/1998 | Nealon et al. | ............... 455/450 |
| 5,768,345 | A | * | 6/1998 | Takebe et al. | ............... 455/464 |
| 5,809,417 | A | * | 9/1998 | Nealon et al. | ............... 455/450 |
| 5,926,766 | A | * | 7/1999 | Yamagata et al. | ............ 455/464 |
| 6,002,939 | A | * | 12/1999 | Yamagata | .................... 455/464 |

* cited by examiner

Primary Examiner—Nay Maung
(74) Attorney, Agent, or Firm—William H. Bollman

(57) ABSTRACT

When a plurality of cordless telephones (e.g., digital cordless telephones) are used within range of one another, base units of one or more of the digital cordless telephones may receive transmissions from others of the digital cordless telephones. Conventionally, the base unit would simply ignore information relating to that received from an unintended remote handset, i.e., a remote handset having a security code which fails to match that of the receiving base unit. However, in accordance with the principles of the present invention, information regarding the unique security code received with respect to other remote handsets (i.e., those having security codes which do not match that of the receiving base unit), are logged and used in a way which provides a unique best available channel list to each of the digital cordless telephones so that similar digital cordless telephones operating in a similar environment do not attempt selection of channels in a similar way (causing channel inclarity and/or interference). In a first embodiment, the list of best available channels is randomized based on the unique security code of the relevant digital cordless telephone. In a second embodiment, the list of best available channels is randomized only when another digital cordless telephone becomes within transmission range of the relevant digital cordless telephone. In a third embodiment, a list of best available channels is uniquely indexed for each digital cordless telephone based on a ranking of the digital cordless telephones within transmission range of one another. For instance, the highest ranking digital telephone in an environment with three digital cordless telephones attempts use of, preferably in order, the $1^{st}$, $4^{th}$, $7^{th}$, $10^{th}$, etc. channels.

19 Claims, 4 Drawing Sheets

FIG. 2

| SECURITY CODE | # TIMES RECEIVED | LAST RECEIVED DATE | # TIMES RECEIVED IN LAST X TIME PERIOD |
|---|---|---|---|
| 72469 | 6 | FEB. 6, 1999 | 3 |
| 12372 | 1 | DEC. 12, 1998 | 0 |
| 67812 | 125 | FEB. 15, 1999 | 76 |
| 51121 | 50 | JAN. 1, 1999 | 22 |
| ⋮ | | | | the freedom to roam about a house or small office while
CHANNEL SELECTION AND CLARITY IMPROVEMENT FOR DIGITAL CORDLESS TELEPHONES OPERATING IN AN OVERLAPPED RANGE

BACKGROUND OF THE INVENTION

1. Field of the Invention

This invention relates generally to cordless telephones. More particularly, it relates to a technique for avoiding channel interference with an improved channel selection for each of separate digital cordless telephones.

2. Background of Related Art

Cordless telephones are extremely useful devices. The remote handset of a cordless telephone provides a user with the freedom to roam about a house or small office while conversing in a telephone call.

A typical cordless telephone utilizes one communication channel for voice transmissions from the remote handset to the corresponding base unit, and another communication channel for voice transmissions from the base unit to the remote handset. In the case of a narrowband digital cordless telephone, time division multiplexing and/or frequency multiplexing techniques are typically used, providing additional channels, e.g., a control data channel in each direction for passing control data relating to, e.g., tuning of the selected channel, turning the remote handset of the cordless telephone ON and OFF, etc.

Most cordless telephones are capable of operating over any one of a plurality of RF channels in either direction, allowing a "best available" type option for selection of an RF channel hopefully having the least amount of interference. In early cordless telephones, few RF channels were made available, e.g., only two possibilities. However, in more recent cordless telephones, e.g., digital cordless telephones, the cordless telephone is capable of communication over any one (or more) or a large plurality of available RF channels, e.g., ten (10), twenty (20), sixty-four (64), or more RF channels.

FIG. 3 shows a plurality of conventional digital cordless telephones in operation within an overlapping area of coverage.

In particular, a first digital cordless telephone 400a, 402a, a second digital cordless telephone 400b, 402b, and even a third digital cordless telephone 400c, 402c may be in operation within a limited area, e.g., within a home or small business. In such a case, the range of transmission of each of the respective remote handsets 402a–402c is such that more than just the intended base unit will receive the transmission. The base units of conventional digital cordless telephones will ignore transmissions from remote handsets which do not include a matching security code with that assigned to the respective base unit.

Even with the larger number of available RF channels, improvements in the range of cordless telephone remote handsets have nevertheless increased the probability that two or more cordless telephones will at least attempt at times to operate using the same selected RF channel, causing channel interference on the common selected channel for one or both of the conflicting cordless telephones.

This conflict is exacerbated somewhat by the fact that a consumer will oftentimes buy two or more of the same cordless telephone for installation in a number of locations throughout a home or small office. It is likely that at least two of these installed cordless telephones will be within range of one another. However, often unbeknownst to the consumer, if the cordless telephones are identical, they will most likely use the same channel allocation algorithm for selection of an appropriate RF channel.

For instance, when more than one digital cordless telephone is implemented with a number of RF channels, at least one which overlaps with a same RF channel of another digital cordless telephone, it is likely that the operations of the two cordless telephones will conflict at least with respect to the one overlapping RF channel, possibly preventing remote communications for either or both digital cordless telephone(s).

The RF channel used for communications is controlled by a processor such as a microprocessor, microcontroller, or digital signal processor (DSP).

Moreover, use of the same conventional RF channel selection algorithm without consideration of outside factors is likely to cause assignment of the same RF channel for use by both cordless telephones based on similar criteria, causing deteriorated clarity and even interference in that RF channel. In general, this type of conflicting situation is likely to cause poor communications for both cordless telephones.

FIG. 4 is a detailed block diagram of the relevant portions of a base unit of a conventional digital cordless telephone.

In particular, FIG. 4 shows a conventional base unit 400 which ignores entirely transmissions from remote handsets not including a particular security code assigned to that particular base unit. Channel selection in such conventional base units are performed either randomly, at the direction of the user, and/or based on channel conditions irrespective of the content of transmissions from non-matching, unauthorized remote handsets.

The base unit 400 includes an RF front end capable of transmitting and receiving on any of, e.g., ten (10) sets of RF channels. The available RF channels may be, for example, time division multiplexed channels transmitted at a common frequency, frequency division multiplexed, or a combination of both time division and frequency multiplexing. The particular transmission and receiving frequencies are selected by a channel selector module 460 based on predetermined criteria, e.g., based on current interference conditions in the channels. In many digital cordless telephones, the current channels are selected at random, and changed as interference conditions warrant.

A received security code authorization module 470 retains the unique security code assigned to the particular base unit 400 and its matching remote handset 402 (not shown in FIG. 4). Transmissions received by the base unit 400 are authorized for processing by the received security code authorization module 470 only if they include the appropriate security code matching that is assigned to the particular base unit. If a received transmission does not include the appropriate security code, the received transmission is discarded.

A controller 450 controls the general operations of the base unit 400. The controller is typically any suitable processor, e.g., a microprocessor, a microcontroller, or a digital signal processor (DSP). A telephone line interface (TLI) 440 provides the appropriate AC and DC impedance matching to the telephone in both an on-hook and off-hook condition. The telephone line interface 440 also provides a ring detect signal to the controller 450 upon detection of an incoming ring signal preceding an incoming telephone call.

A codec 430 provides the appropriate analog-to-digital and digital-to-analog conversion between the RF front end 480 and the telephone line interface 440.

RF communication channels in a digital cordless telephone are typically selected by brute force, i.e., by scanning all available RF channels and selecting for use those RF channels with the least amount of interference. Channel scanning is typically performed when the base and handset cease communications. The handset is then in the receive only mode, commonly referred to as the standby mode. Thus, conventional digital cordless telephones select RF channels for communications between the assigned remote handset and its matching base unit based on current conditions of the particular RF channel irrespective of the cause of the interference (e.g., because of another digital cordless telephone within range of the relevant base unit utilizing the same RF channel). As a result, the probability of collisions between separate digital cordless telephones using the same RF channel is significant, particularly as the range of typical digital cordless telephones continues to increase in response to consumer demand.

Thus, there is a need for an improved technique and apparatus for digital cordless telephones to select RF communication channels in such a way as to avoid channel interference caused by range overlap with another digital cordless telephone.

SUMMARY OF THE INVENTION

In accordance with the principles of the present invention, an RF channel selector module for a digital cordless telephone comprises a stored list containing an identity of at least one other cordless telephone within a transmission range of the digital cordless telephone. An overlapping channel selector module is adapted to arrange a plurality of best available RF channels based on the identity of at least one other cordless telephone.

A method of selecting an RF channel for a digital cordless telephone based on a presence of other cordless telephones within transmission range of the digital cordless telephone in accordance with another aspect of the present invention comprises determining a list of best available RF channels. The list of best available RF channels is randomly arranged based on unique information regarding the digital cordless telephone.

BRIEF DESCRIPTION OF THE DRAWINGS

Features and advantages of the present invention will become apparent to those skilled in the art from the following description with reference to the drawings, in which:

FIG. 2 shows an exemplary identified overlapping security code list, in accordance with the principles of the present invention.

DETAILED DESCRIPTION OF ILLUSTRATIVE EMBODIMENTS

The present invention provides an improved channel selection apparatus and method for use in digital cordless telephones, e.g., for use in the base unit of digital cordless telephones, particularly those narrowband digital cordless telephones likely to operate over one or more common RF channels.

In accordance with the principles of the present invention, the identity of other digital cordless telephones sharing the current operating range of a relevant digital cordless telephone will be interpreted and logged by a non-matching base unit for use in an advanced channel selection criteria affected by the presence of non-matching digital cordless telephones. In this way, channel selection can be performed more reliably with improved channel clarity and less conflicts and/or interference between digital cordless telephones utilizing at least one common RF channel.

Figure 1:
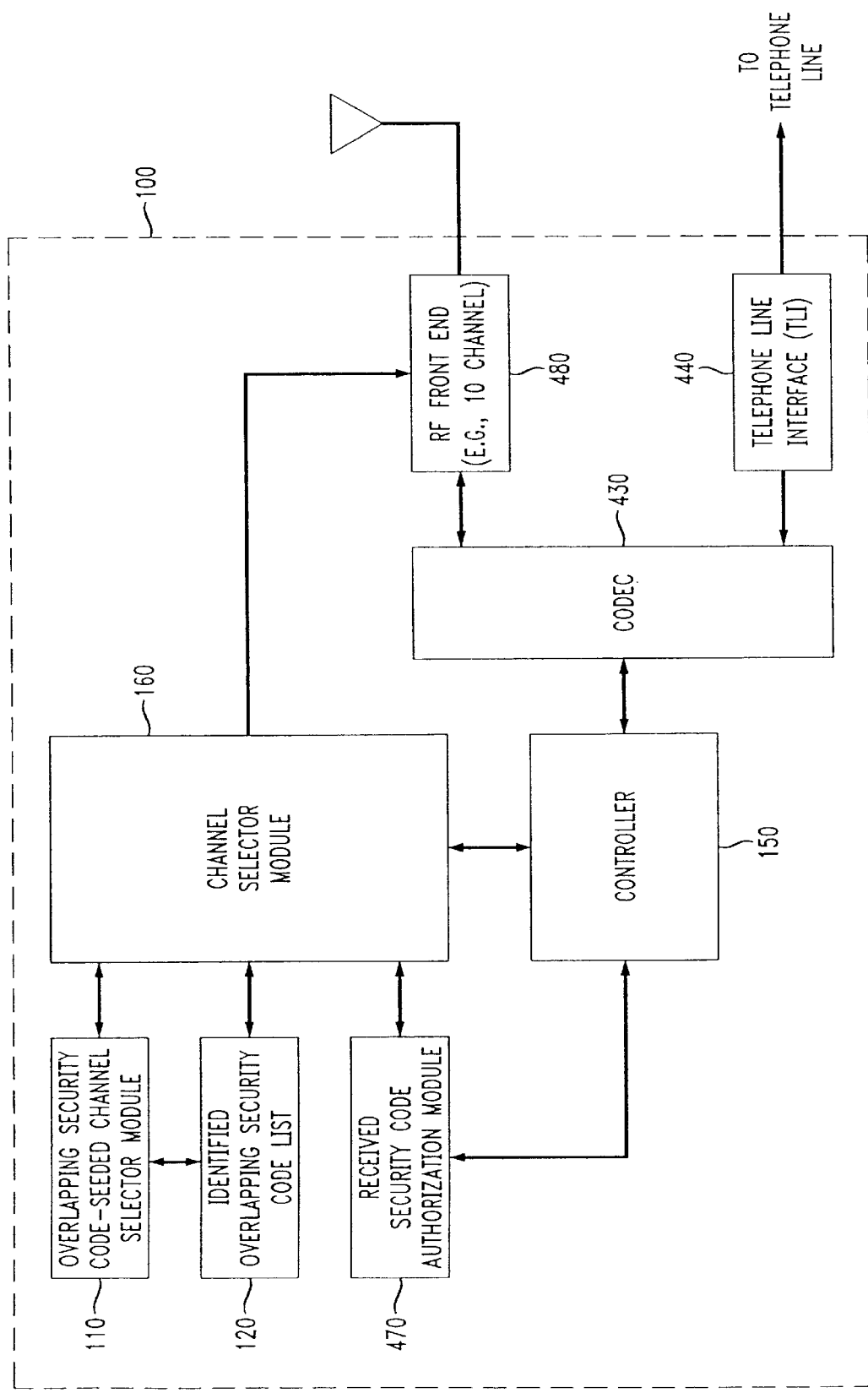
FIG. 1 shows a base unit capable of selecting an RF channel based on an identity of non-matching or unauthorized digital cordless telephones operating within transmission range of the base unit, in accordance with the principles of the present invention.
Figure 3:
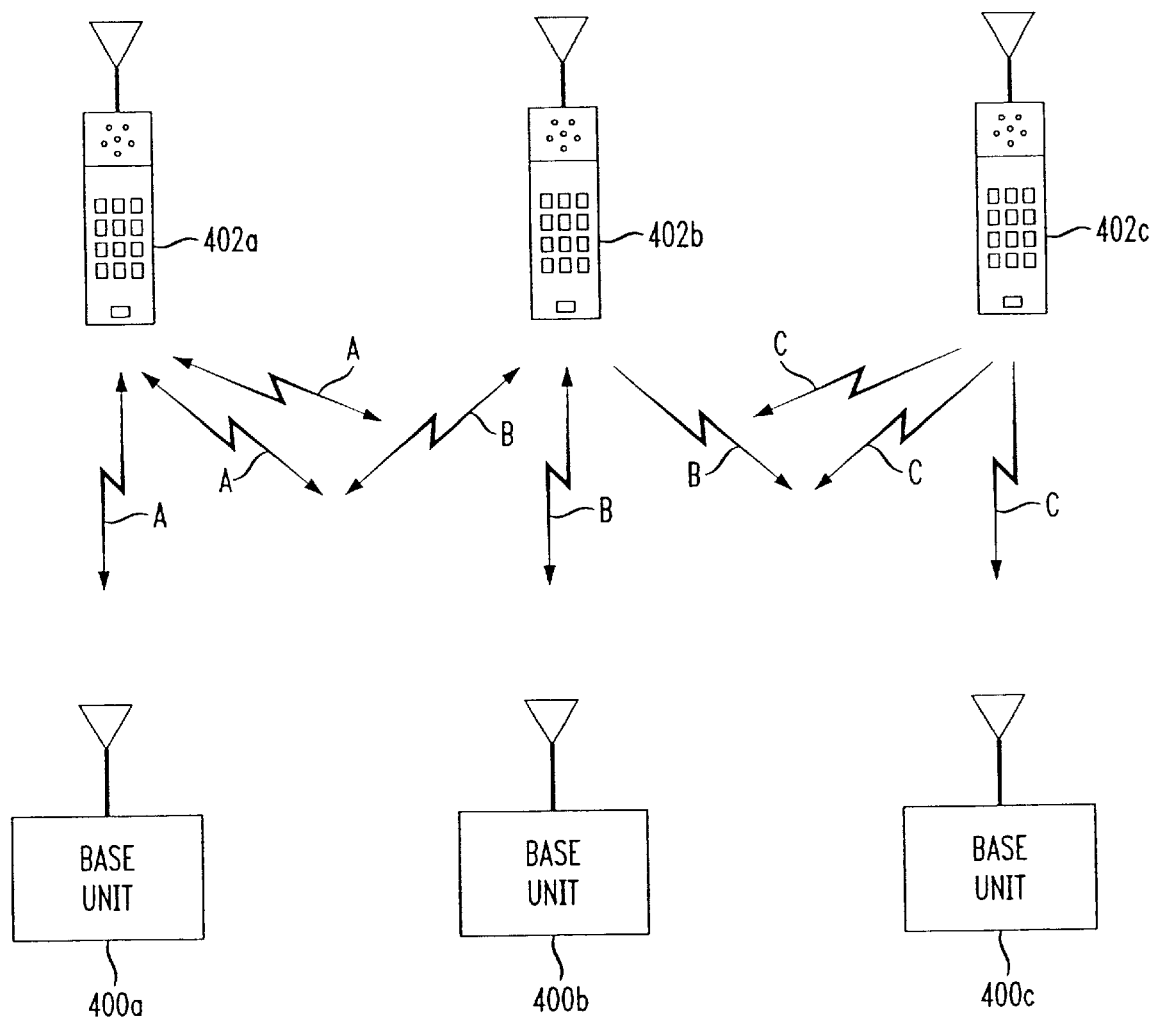
FIG. 3 shows a plurality of conventional digital cordless telephones in operation within an overlapping area of coverage.
Figure 4:
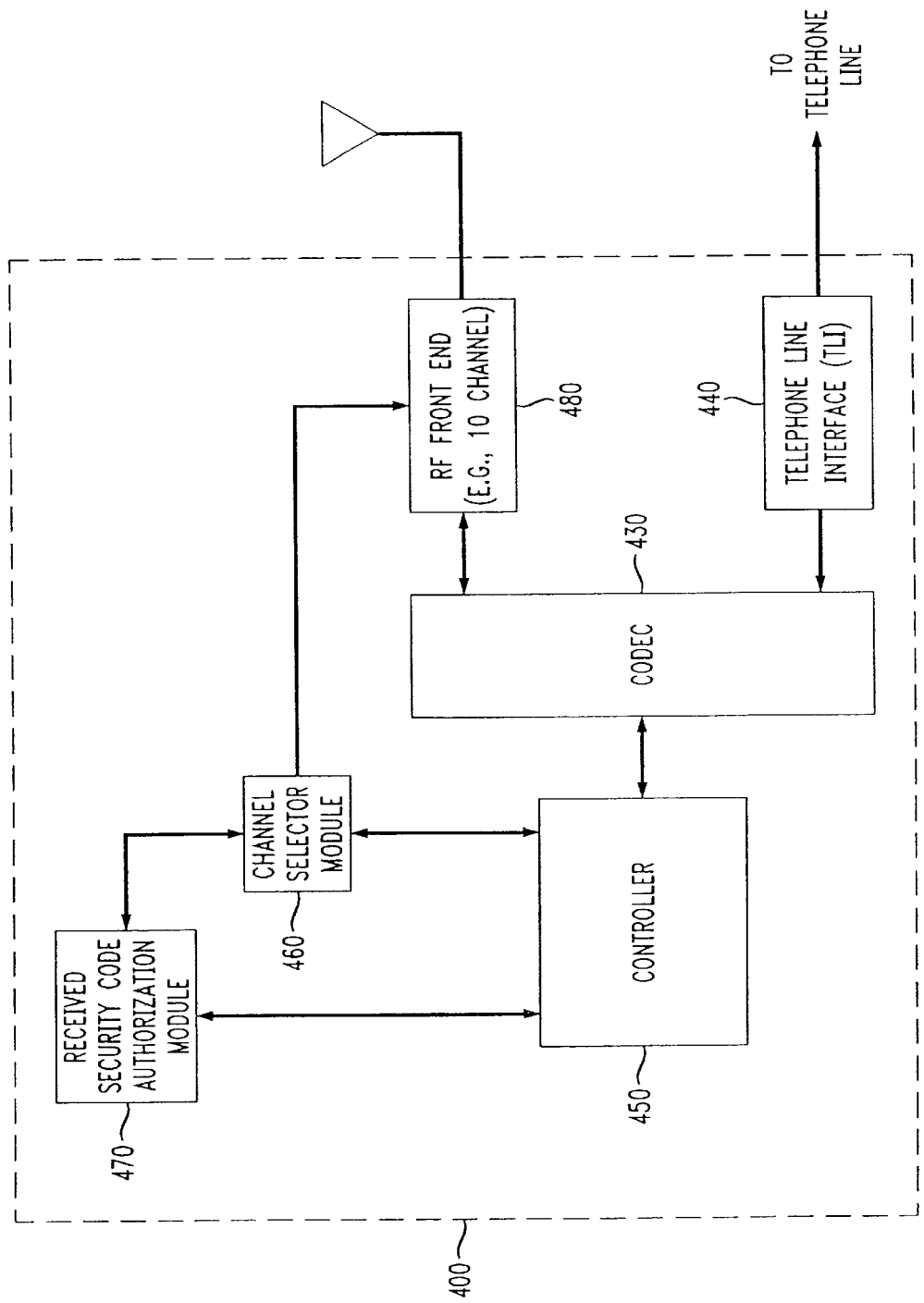
FIG. 4 is a detailed block diagram of the relevant portions of a base unit of a conventional digital cordless telephone.

FIG. 1 shows a base unit 100 capable of selecting an RF channel based on an identity of non-matching or unauthorized digital cordless telephones operating within transmission range of the base unit, in accordance with the principles of the present invention.

In particular, the base unit 100 includes conventional digital cordless telephone components such as a codec 430, RF front end 480, and telephone line interface 440. However, the RF channels used by the base unit 100 are selected by an appropriate channel selector module 160 based on received identification information (e.g., a security code) associated with non-matching or unauthorized digital cordless telephones.

In accordance with the principles of the present invention, received transmissions are compared with an expected security code assigned to the relevant base unit 100 and its matching remote handset by a received security code authorization module 470. If the received transmission is from the matching or authorized remote handset, then communications proceed as usual.

In accordance with the principles of the present invention, RF channels are selected based on the identity of other digital cordless telephones within transmission range of the base unit 100 under the direction of an overlapping security-seeded channel selector module 110 and supporting identified overlapping security code list 120.

The overlapping security code-seeded channel selector module 110 provides a ranked list of best available RF channels for the relevant digital cordless telephone based on the identity and history of other digital cordless telephones within transmission range of the relevant base unit 100. The identity and history of other digital cordless telephones within transmission range are maintained in the identified overlapping security code list 120.

In the disclosed embodiments, best available channels are determined to be those which have the lowest receive signal strength indication (RSSI). Of course, other techniques for determining the channels with the least amount of energy or interference may be used, in accordance with the principles of the present invention.

In one embodiment of the present invention, the unique security codes passed between a remote handset and its respective base unit of one or more other digital cordless telephones within transmission range are received and logged in the identified overlapping security code list 120. The non-matching security code is logged into the identified overlapping security code list 120 either as a new entry if it is the first time that the subject digital cordless telephone has been detected within transmission range, or as an update to a current entry relating to the frequency of the subject digital cordless telephone.

The detection of other digital cordless telephones may be performed as a scan at a predetermined time, e.g., after turning the relevant remote handset off to select a channel for the next operation of the remote handset, or may be passively logged over a longer period of time as the other digital cordless telephones are used. In such a case, the base unit will preferably monitor the relevant RF channels for use by other digital cordless telephones even when not in use with respect to its own matching remote handset.

For each remote handset (or even base unit) the base unit 100 is able to make contact with, a received security code will be stored as an entry in the identified overlapping security code list 120. The overlapping security code list 120 may be maintained in any appropriate memory or storage device, but preferably stored in non-volatile memory or storage, e.g., in Flash memory or a hard drive device interfaced with the controller 150.

With respect to communications and reception of information from other remote handsets, appropriate RF synchronization including synchronization of frequency and time alignment may be required between the base unit and the respective remote handset.

Armed with content-related information regarding other digital cordless telephones within transmission range, the base unit 100 will attempt to allocate the best of its available radio frequency (RF) channels based on, e.g., known affects due to the particular digital cordless telephones within transmission range utilizing each of the RF channels.

FIG. 2 shows an exemplary identified overlapping security code list, in accordance with the principles of the present invention.

In particular, in the example of FIG. 2, four (4) non-matching, unauthorized digital cordless telephones are logged in four respective entries 202–208.

For each of the entries 202–208, identification information is obtained. The identification information may be as simple as the security code itself (as shown), or may be customized, e.g., to relate to the manufacturer and/or model of the digital cordless telephone detected. The identification information may alternatively relate to an approximate distance and/or strength of signal detected by the base unit 100.

Each entry may also include information 221–223 relating to the frequency of use of the other digital cordless telephones that are within transmission range of the base unit 100. For instance, the entries 202–208 may each maintain a log of the number of telephone calls detected from the other digital cordless telephones (i.e., "# times received") 221, the time and/or date of the last received transmission from the relevant digital cordless telephone.

A recent frequency of use of the other digital cordless telephones within transmission range may also be maintained. In the example of FIG. 2, the number of times 223 that all or part of a telephone call on another digital cordless telephone has been received by the base unit 100 may be maintained. This recent frequency count 223 may be incremented with recent detections, and may be decremented for each period of time (e.g., each day) that a transmission is not received from the relevant digital cordless telephone.

Channel selection to a best available RF channel is preferred to occur in response to a suitable command, e.g., in response to a TELEPHONE ON or CHANNEL CHANGE command from the remote handset. Of course, channel selection can happen at any time during operation of the digital cordless telephone in accordance with the principles of the present invention.

During a suitable command, e.g., during a TELEPHONE ON or CHANNEL CHANGE operation, the best available channel for communications between the relevant remote handset and its base unit 100 (i.e., for voice data and/or for control data) is selected by the overlapping security code-seeded channel selector module 110 based on the knowledge and identity of other digital cordless telephones within the relevant digital cordless telephone's operating range as maintained in the identified overlapping security code list 120.

Once selected, it is preferred that the best available RF channel remain in use for the duration of a particular telephone call. Of course, the RF channel may be re-selected in accordance with the principles of the present invention one or more times during the telephone call, but nevertheless switches to a new channel selected based on information regarding the identity of other digital cordless telephones within the range of the relevant digital cordless telephone.

In conventional digital cordless telephones, unique security codes are sent in each RF transmission between a cordless telephone's handset and its base unit, e.g., in header information. These unique security codes are conventionally used to secure identification between any remote handset and its appropriately paired base unit. Conventional base units simply ignore information received from an unintended remote handset, i.e., a remote handset having a security code which fails to match that of the receiving base unit. However, in accordance with the principles of the present invention, information regarding the identity of non-matching digital cordless telephones is stored, e.g., in the identified overlapping security code list 120, and used to select a best channel, based on, e.g., lowest receive signal strength indication (RSSI), given the environment in which the relevant digital cordless telephone finds itself.

Channel selection techniques will be similar in each affected digital cordless telephone when two (or more) digital cordless telephones are operating in an overlapping transmission range, particularly if the relevant digital cordless telephones are identical, e.g., manufactured by the same company, etc. Thus, effective avoidance of channel interference may not be possible, or may require an excessively long period of time before the respective channel selection algorithms differ sufficiently to direct each of the affected digital cordless telephones onto different, non-interfering channels.

The overlapping security code-seeded channel selector module 110 provides a list of best available RF channels for selection by the channel selector module 160. The list of best available RF channels is preferably "seeded" to provide different lists of RF channels even with respect to identically manufactured digital cordless telephones operating in near identical environmental conditions (e.g., installed in the same home or small office).

Three separate exemplary embodiments are disclosed for the "seeding" of the overlapping security code-seeded channel selector module 110 to provide unique best available lists of RF channels based on information regarding the identity of other digital cordless telephones within transmission range.

1. Security Code Seed as Best Channel Randomizer:

In this embodiment, the overlapping security code-seeded channel selector module 110 pseudo-randomizes an ordering of a list of best RF channels if at least one other digital cordless telephone has been detected within transmission range (e.g., detected within the last month, within the last week, etc.). If so, the list of best RF channels is pseudo-randomized with a pseudo-random ordering generator. In the disclosed embodiment, in order to provide a unique seeding for each digital cordless telephone, the security code of the relevant digital cordless telephone is used to seed the pseudo-random ordering generator. Thus, since each digital cordless telephone (even of identical make) has a unique security code assigned thereto, the best available RF channel list will be ordered differently for each digital cordless telephone within transmission range, and thus will be less likely to conflict in the same RF channels.

2. Security Code Seed as Best Channel Randomizer With Known Interference:

In this embodiment, the ordering of a list of best available RF channels is randomized when another digital cordless telephone is detected within transmission range (e.g., within the past month, within the past year, etc.).

To monitor the frequency and/or recency of receipt of transmissions from other digital cordless telephones, the base unit may store the identity (e.g., security code) of all other digital cordless telephones within range, and log them in a list (e.g., in the identified overlapping security code list 120).

The relevant base unit can perform a scan of all available RF channels and perhaps locate, e.g., the best ten (10) RF channels out of a possible larger number, e.g., out of forty

(40) possible RF channels. Armed with information regarding the presence and/or identity of other digital cordless telephones, the base unit can randomize the list of best available RF channels (e.g., the best ten (10) RF channels) using its own unique primary security code as a seed. The selected RF channel can be utilized, e.g., when the user presses the remote handset's TELEPHONE ON key for a subsequent telephone call (or other suitable time). In such a case, the relevant base unit will inform its matching remote handset to switch from its current RF channel to the selected best RF channel as determined from the seeded list.

3. Security Code Rank as Best Channel Randomizer:

In this embodiment, each base unit stores the identities of all other digital cordless telephones in a list (e.g., the identified overlapping security code list 120) and ranks all digital cordless telephones within transmission range. In the disclosed embodiment, the digital cordless telephones are ranked in accordance with the numeric value of each of their respective security codes. Of course, any suitable non-biased ranking can be used which provides a similar ranking in any of the digital cordless telephones within transmission range.

Based on the ranking presumably known to all digital cordless telephones within range, the RF channels for the respective digital cordless telephones can be selected orderly. For instance, in the disclosed embodiment, with the knowledge that there are, e.g., three (3) digital cordless telephones within range, and that the relevant digital cordless telephone is, e.g., ranked first among the three based on its security code, the relevant digital cordless telephone would attempt use of the $1^{st}$, $4^{th}$, $7^{th}$, $11^{th}$, etc. RSSI-ranked RF channels, in order, in the best available list. Similarly, the second ranked digital cordless telephone would attempt use of the $2^{nd}$, $5^{th}$, $8^{th}$, $12^{th}$, etc. RSSI-ranked RF channels, in order, in the best available list. The third ranked digital cordless telephone would attempt use of the $3^{rd}$, $6^{th}$, $9^{th}$, $13^{th}$, etc. RSSI-ranked RF channels, in order, in the best available list.

Thus, an index or offset can be established for selection of RF channels from a determined best RF channel list (e.g., from the ten (10) best channels logged in a best available RF channel list) based on the knowledge of the security codes or other unique information regarding other digital cordless telephones within transmission range. Accordingly, aspects with respect to received transmissions from non-matching components of other digital cordless telephones can be monitored and maintained, to assist in the ranking of RF channels based on the likelihood of the activation of another digital cordless telephone while the relevant digital cordless telephone is in use.

Moreover, a counter based on the number of times that a particular non-matching digital cordless telephone transmission is acquired (from either the non-matching remote handset or from a non-matching base unit) can be maintained to rank the relative likelihood of the active overlap of another digital cordless telephone with the transmission range of the relevant digital cordless telephone. Then, entries can be removed from the list as if they were not within the transmission range if the counter relating to that digital cordless telephone has expired (indicating infrequent and non-recent use of the other digital cordless telephone.)

For instance, in one embodiment, each time a particular transmission containing a non-matching security code is received from another digital cordless telephone, a count 221 relating to the number of times that particular non-matching security code has been encountered by the relevant base unit 100 can be incremented. Similarly, any non-matching security code which has not been detected by the relevant base unit 100 for a period of time, e.g., for 24 hours, for three (3) days, for 1 month, for 12 months, etc., can have an associated count 221 decremented as appropriate (e.g., once for each hour, day, week, etc. that the relevant base unit is in operation) without encountering that particular non-matching security code. In such a system, the overlapping security code-seeded channel selector module 110 would utilize only those entries 202–208 in the identified overlapping security code list 120 associated with a count 221 which is greater than zero.

Thus, it is preferable to occasionally remove entries relating to particular digital cordless telephones from the identified overlapping security code list 120 maintained in accordance with the principles of the present invention. For instance, an entry 204 relating to an infrequently used non-matching digital cordless telephone may be removed, while at the same time entries 202, 206, 208 relating to those non-matching digital cordless telephones which are frequently used may be retained and even reinforced over time.

The principles of the present invention allow for greatly improved interference mitigation in the RF communications between remote handsets and their matching base units by selecting RF channels based on information contained in transmissions received from unauthorized (i.e., non-matching) digital cordless telephones.

Implementation of the principles of the present invention not only avoids pitfalls commonly found with the use of multiple digital cordless telephones, possibly discouraging consumers from purchasing multiple digital cordless telephones from a same manufacturer, it encourages the opposite, i.e., purchase of multiple digital cordless telephones each having RF channel selection based on an identification of other digital cordless telephones operating within common RF channels, to improve the channel clarity for all digital cordless telephones within the applicable transmission range.

Moreover, use of the principles of the present invention greatly increases the number of digital cordless telephones that can be installed within any given overlapping range. This is particularly important as the range of digital cordless telephones continues to increase in response to consumer demand.

While the invention has been described with reference to the exemplary embodiments thereof, those skilled in the art will be able to make various modifications to the described embodiments of the invention without departing from the true spirit and scope of the invention.

What is claimed is:

1. A channel selector module for a first cordless telephone including a first handset associated with a first base unit, comprising:

a stored list containing an identity of a second cordless telephone, including a second handset associated with a second base unit, within a transmission range of said first base unit, said first handset being operable with said first base unit and not with said second base unit; and an overlapping channel selector module adapted to arrange a plurality of channels historically used by said second cordless telephone;

wherein said first cordless telephone can avoid use of a channel historically used by said second cordless telephone.

2. The channel selector module for a first cordless telephone according to claim 1, wherein:

said first cordless telephone is a digital cordless telephone.

3. The channel selector module for a first cordless telephone according to claim 1, wherein:

said identity of said second cordless telephone includes a unique security code assigned to said second handset.

4. The channel selector module for a first cordless telephone according to claim 1, wherein:

said plurality of best available channels are arranged based on a direction from a pseudo-random generator.

5. The channel selector module for a first cordless telephone according to claim 4, wherein:

said pseudo-random generator is seeded with a security code assigned to said first cordless telephone.

6. The channel selector module for a first cordless telephone according to claim 1, wherein:

said overlapping channel selector module arranges said plurality of best available channels when said second cordless telephone is detected within transmission range of said first cordless telephone.

7. The channel selector module for a first cordless telephone according to claim 1, wherein:

arrangement of said plurality of channels is based on a respective value of security codes relating to said second cordless telephone detected within transmission range of said first cordless telephone.

8. A method of selecting a channel for a first cordless telephone based on a presence of a second cordless telephone, not matched with said first cordless telephone, but within transmission range of said first cordless telephone, comprising:

maintaining in said first cordless telephone a list of channels used by said second cordless telephone within range of said first cordless telephone;

wherein a first handset of said first cordless telephone is operable with a first base unit of said first cordless telephone and not with any base unit of said second cordless telephone.

9. The method of selecting an channel for a first cordless telephone based on a presence of a second cordless telephone, not matched with said first cordless telephone, but within transmission range of said first cordless telephone according to claim 8, further comprising:

a security code assigned to said second cordless telephone.

10. The method of selecting an channel for a first cordless telephone based on a presence of a second cordless telephone, not matched with said first cordless telephone, but within transmission range of said first cordless telephone according to claim 8, wherein:

said list of channels is randomly arranged based on unique information regarding said second cordless telephone.

11. The method of selecting an channel for a first cordless telephone based on a presence of a second cordless telephone, not matched with said first cordless telephone, but within transmission range of said first cordless telephone according to claim 10, further comprising:

a respective security code assigned to said second cordless telephone.

12. The method of selecting an channel for a first cordless telephone based on a presence of a second cordless telephone, not matched with said first cordless telephone, but within transmission range of said first cordless telephone according to claim 8, further comprising:

scanning a plurality of channels to obtain said list of channels.

13. Apparatus for selecting a channel for a first cordless telephone based on a presence of a second cordless telephone within transmission range of said first cordless telephone, comprising:

means for determining a list of best available channels not recently used by said second cordless telephone; and means for randomly arranging said list of best available channels based on unique information regarding said second cordless telephone;

wherein a first handset of said first cordless telephone is operable with a first base unit of said first cordless telephone and not with any base unit of said second cordless telephone.

14. The apparatus for selecting a channel for a first cordless telephone based on a presence of a second cordless telephone within transmission range of said first cordless telephone according to claim 13, wherein said unique information comprises:

a security code assigned to said second cordless telephone.

15. The apparatus for selecting a channel for a first cordless telephone based on a presence of a second cordless telephone within transmission range of said first cordless telephone according to claim 13, wherein said unique information comprises:

a respective security code assigned to said second cordless telephone.

16. The apparatus for selecting a channel for a first cordless telephone based on a presence of a second cordless telephone within transmission range of said first cordless telephone according to claim 13, further comprising:

means for scanning a plurality of channels to obtain said list of best available channels.

17. A channel selection controller for a first cordless telephone, comprising:

a list of channels used by a second cordless telephone which are each historically determined to have interfered with a channel otherwise available for use by said first cordless telephone through prior monitoring of channels used by said second cordless telephone; and a processor to assign a channel for operation of said first cordless telephone other than a channel comprised in said list of channels;

wherein a first handset of said first cordless telephone is operable with a first base unit of said first cordless telephone and not with any base unit of said second cordless telephone.

18. The channel selection controller for a first cordless telephone according to claim 17, wherein:

said list of channels is arranged is pseudo-random order.

19. The channel selection controller for a first cordless telephone according to claim 17, wherein:

said list of channels is purged of those channels which historically interfered with said second handset of said second cordless telephone within range of said first cordless telephone.

* * * * *